A. C. VAUGHAN.

Head Light for Locomotives.

No. 3,471.

Reissued June 1, 1869.

Witnesses
W. A. A. McKinley
Wm J. Burns

Inventor
Aaron C. Vaughan

N. PETERS, Photo-Lithographer, Washington, D. C.

United States Patent Office.

AARON C. VAUGHAN, OF PHILADELPHIA, PENNSYLVANIA.

*Letters Patent No.* 71,431, *dated November* 26, 1867; *reissue No.* 3,471, *dated June* 1, 1869.

HEAD-LIGHT FOR LOCOMOTIVES.

The Schedule referred to in these Letters Patent and making part of the same.

*To all whom it may concern:*

Be it known that I, AARON C. VAUGHAN, of Philadelphia, Pennsylvania, did invent certain Improvements in Head-Lights for Locomotives; and I do hereby declare the following to be a full, clear and exact description of the same.

My invention consists of certain improvements, fully described hereafter, in the head-lights of locomotives, whereby the railroad-track is illuminated more intensely and to a greater distance than by the ordinary head-lights.

In order to enable others skilled in the art to make and apply my invention, I will now proceed to describe its construction and operation, reference being had to the accompanying drawing which forms a part of this specification, and in which—

Figure 1:
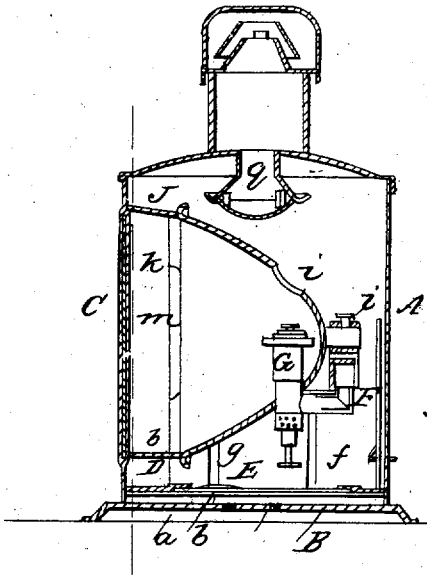
Figure 2:
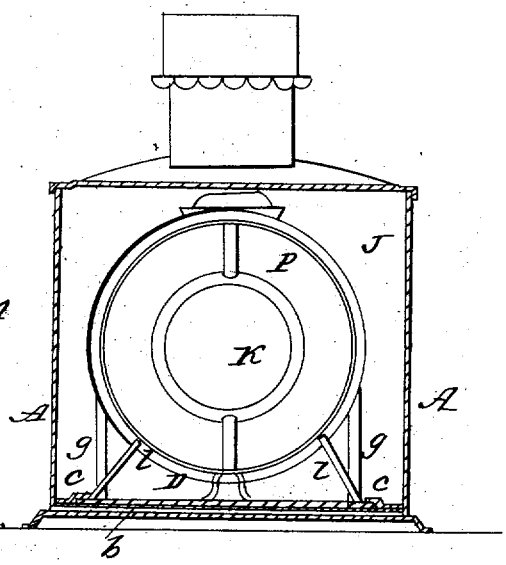

Figure 1 is a vertical section of my improved head-light for locomotives;

Figure 2, a front view of the same, partly in section; and

Figure 3:
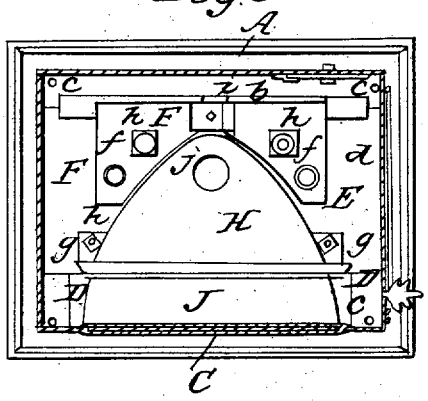

Figure 3, a plan view, with the outer casing in section.

Similar letters refer to similar parts throughout the several views.

At the base of the casing A of the head-light, is a chamber, B, in the bottom plate of which are holes *a a*, and in each corner of the plate *b*, which forms the top of the chamber, is a hole, *c*, figs. 2 and 3, for a purpose described hereafter.

In the front of the casing A is the usual circular opening C, covered by a plate of glass, and on the side of the casing is a hinged door, *d*, fig. 3.

Two plates, D and E, are introduced into the casing through the door *d*, and rest upon the top plate *b* of the chamber B, the edges of the plates being in contact with each other, and being adapted to suitable guides on the said top plate *b*, as shown in figs. 1 and 2, so that the plates and their attachments may be withdrawn from and replaced in the casing at pleasure.

Four vertical screw-rods, *f f* and *g g*, are secured to the sliding plate E, and the two former pass through an oil-reservoir, F, which is secured to the rods by means of the nuts *h*, figs. 1 and 3.

Connected to the reservoir F is the lamp-burner G.

The rods *g g* serve to support the polished-metal reflector H, which is also secured, by means of its rear projection *i*, to the oil-reservoir F, as shown in figs. 1 and 2.

Part of the reflector H is of the usual parabolic form, and through an opening near its rear end passes the lamp-burner, an opening, *j*, being cut in the reflector immediately above the burner for the admission of the upper end of the ordinary glass chimney.

From the front edge of the parabolic portion of the reflector H, extends a polished reflecting-band J, made in the shape of the frustum of a cone, secured to the plate D by stays *l l*, or formed with the parabolic reflector.

A lens, K, convex on the front side *m*, and slightly convex on the opposite side, may be used concentric with the band J, at the end of the same nearest to the reflector H, figs. 1 and 2.

Air is admitted to the chamber B through the holes *a a*, in the bottom plate of the casing, and passes thence, through the corner-holes *c c*, into the interior of the casing. The air is thus more evenly distributed, the casing and its contents maintained in a cooler state, and the burner more effectually protected from the effects of sudden gusts of wind than if the air were admitted at one or more central points as usual, and without first passing into a distributing-chamber.

The heated air and gases pass off through the flaring tube *q*, and through the usual ventilator at the top of the casing.

I have found that the illumination of the track is increased, both as regards distance and intensity, by the use of the reflecting-ring, having the form of the surface of a frustum of a cone in front; so much so, indeed, that the track is lighted to a distance of about four hundred yards from the head-light, instead of for the usual distance of about a hundred yards.

A lens may be used with or without the rim or extension J, and the rim or extension J may be used without the lens.

I claim—

1. In combination with a parabolic reflector, an extension or rim J, shaped in the form of a frustum of a cone, attached to the parabola.

2. A parabolic reflector, and, attached thereto, the frustum of a cone, either with or without the use of a lens, substantially as described.

AARON C. VAUGHAN

Witnesses:

GEORGE E. BUCKLEY,

W. A. A. MCKINLEY.